United States Patent
Wang et al.

(10) Patent No.: US 12,171,041 B2
(45) Date of Patent: Dec. 17, 2024

(54) DISCONTINUOUS RECEPTION ACTIVATION/DEACTIVATION BASED ON COMMUNICATION LAYER 1 AND LAYER 2 SIGNALING

(71) Applicant: Telefonaktiebolaget LM Ericsson (publ), Stockholm (SE)

(72) Inventors: Wei Wang, Kanata (CA); Haomin Li, Kanata (CA); Patrick Lie Chin Cheong, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 430 days.

(21) Appl. No.: 17/612,305

(22) PCT Filed: May 24, 2019

(86) PCT No.: PCT/IB2019/054351
§ 371 (c)(1),
(2) Date: Nov. 18, 2021

(87) PCT Pub. No.: WO2020/240247
PCT Pub. Date: Dec. 3, 2020

(65) Prior Publication Data
US 2022/0232664 A1    Jul. 21, 2022

(51) Int. Cl.
| | |
|---|---|
| H04J 3/14 | (2006.01) |
| H04W 72/23 | (2023.01) |
| H04W 74/0833 | (2024.01) |
| H04W 76/28 | (2018.01) |
| H04W 80/02 | (2009.01) |

(52) U.S. Cl.
CPC ........... *H04W 76/28* (2018.02); *H04W 72/23* (2023.01); *H04W 74/0833* (2013.01); *H04W 80/02* (2013.01)

(58) Field of Classification Search
CPC . H04W 76/28; H04W 72/23; H04W 74/0833; H04W 80/02; Y02D 30/70
USPC ........................................................ 370/252
See application file for complete search history.

(56) References Cited

U.S. PATENT DOCUMENTS

| | | | |
|---|---|---|---|
| 8,432,843 B2 | 4/2013 | Cai et al. | |
| 2014/0211673 A1* | 7/2014 | Lu ..................... | H04W 52/0216 |
| | | | 370/311 |
| 2018/0227919 A1* | 8/2018 | Lee ....................... | H04W 72/21 |

(Continued)

OTHER PUBLICATIONS

International Search Report and Written Opinion dated Feb. 12, 2019 issued in PCT Application No. PCT/IB2019/054351, consisting of 12 pages.

(Continued)

*Primary Examiner* — Chuong T Ho
(74) *Attorney, Agent, or Firm* — Weisberg I.P. Law, P.A.

(57) ABSTRACT

A method, network node, wireless device and system are provided. According to one aspect of the disclosure, a network node is provided. The network node includes processing circuitry configured to: cause transmission of a Discontinuous Reception, DRX, configuration to a wireless device using communication layer 3 signaling, cause transmission of an indication to the wireless device to trigger activation at one of communication layer 1 and communication layer 2 of the DRX configuration, and optionally determine whether the wireless device has activated the DRX configuration.

36 Claims, 10 Drawing Sheets

(56) References Cited

U.S. PATENT DOCUMENTS

| | | | | |
|---|---|---|---|---|
| 2019/0342936 A1* | 11/2019 | Wu | ............... | H04W 76/10 |
| 2020/0037396 A1* | 1/2020 | Islam | ............... | H04W 52/0229 |
| 2020/0245395 A1* | 7/2020 | Zhang | ............... | H04L 5/0053 |
| 2020/0260486 A1* | 8/2020 | Zhou | ............... | H04L 1/1819 |
| 2021/0243835 A1* | 8/2021 | Priyanto | ............... | H04W 72/23 |
| 2022/0191793 A1* | 6/2022 | Murray | ............... | H04W 52/0232 |

OTHER PUBLICATIONS

3GPP TS 25.308 V15.0.0 (Sep. 2017); 3rd Generation Partnership Project; Technical Specification Group Radio Access Network; High Speed Downlink Packet Access (HSDPA); Overall Description; Stage 2 (Release 15), consisting of 73 pages.

Huawei, HiSilicon, 3GPP TSG-WG2 Meeting #91bis, R2-154213; Title: CR to 25.308 on L2 and L3 Downlink Enhancements, Malmo, Sweden, Oct. 5-9, 2015, consisting of 14 pages.

* cited by examiner

DISCONTINUOUS RECEPTION ACTIVATION/DEACTIVATION BASED ON COMMUNICATION LAYER 1 AND LAYER 2 SIGNALING

CROSS-REFERENCE TO RELATED APPLICATIONS

This application is a Submission Under 35 U.S.C. § 371 for U.S. National Stage Patent Application of International Application Number: PCT/IB2019/054351, filed May 24, 2019 entitled "DISCONTINUOUS RECEPTION ACTIVATION/DEACTIVATION BASED ON COMMUNICATION LAYER 1 AND LAYER 2 SIGNALING," the entirety of which is incorporated herein by reference.

TECHNICAL FIELD

Wireless communication and in particular, discontinuous reception (DRX) control using at least in part communication layer 1 and/or layer 2 signaling for helping reduce misalignment of a DRX state between the network node and wireless device and/or helping align a DRX status between the network node and wireless device.

BACKGROUND

Connected mode discontinuous reception (DRX) is one manner to reduce the power consumption at wireless devices that implement wireless communication protocols such as the $3^{rd}$ Generation Partnership Project's (3GPP) New Radio (NR, also referred to as $5^rG$). When the wireless device is configured with DRX, the wireless device may monitor DRX discontinuously by following a DRX cycle configured by the network and/or network node.

The DRX cycle repeats periodically and may contain two parts: 1) an "onDuration" which corresponds to a consecutive period in which the wireless device may monitor PDCCH, and 2) another period within the DRX cycle in which the wireless device may not monitor physical downlink control channel (PDCCH).

The configuration of DRX may be sent to the wireless device in a radio resource control (RRC) reconfiguration message. The wireless device may apply the DRX configuration after receiving the RRC reconfiguration message. More specifically, the wireless device may enter the DRX cycle after processing of RRC reconfiguration message. While in the network side and/or at the network node, there are several possible timings to start DRX. One existing method for starting DRX is to start the DRX either after the network sends out the RRC reconfiguration message, or after network node receives a RRC reconfiguration complete message from the wireless device. This existing method may be applied to the reconfiguration-like scenario such as standalone (SA) reconfiguration with DRX configuration after initial setup, non-standalone (NSA) reconfiguration with DRX configuration after secondary cell group (SCG) setup and handover with DRX configuration. In other words, the reconfiguration procedure with configuration of DRX may takes place after the initial setup of SA RRC connection or NSA secondary cell group (SCG) setup.

It may be expected that the network/network node can start the DRX cycle at the same time as the wireless device or aligned with the wireless device's timing when the wireless device starts DRX. However, the timing with respect when to start the DRX cycle between the network/network node and wireless device are not always synchronized. For example, due to the signaling processing delay and/or the transmission delay, there could be a large interval between the wireless device entering DRX and network/network node starting DRX cycle.

In another example, if the network/network node starts DRX immediately after sending the RRC reconfiguration message, the network/network node may stop scheduling the wireless device while the wireless device is still awake (i.e., able to receive transmissions and/or monitoring for transmissions) which results in unnecessary battery consumption at the wireless device. Furthermore, if the RRC reconfiguration message was not received by the wireless device, the network/network node may need to handle this failure case as DRX configuration may not be applied by the wireless device.

On the other hand if the network/network node starts DRX after receiving the RRC reconfiguration complete message, this signifies that most likely the network/network node considers the wireless device to be actively monitoring the dedicated control channel while wireless device may already be asleep since it can take a long time for the network to receive RRC reconfiguration complete message especially when the cell load is high. The downlink (DL) transmissions sent to the wireless device during a DRX unsynchronized state (i.e., send while the network node is in DRX active time and the wireless device is in DRX sleep), may cause radio link control (RLC) acknowledgment mode (AM) to start its supervision timers and, if all of these RLC re-transmissions fail, the result may be RLC delivery failure and the wireless device may be dropped.

SUMMARY

Some embodiments advantageously provide a method and system for discontinuous reception (DRX) control using at least in part communication layer 1 signaling and/or layer 2 signaling for helping reduce misalignment of a DRX state between the network node and wireless device and/or helping align a DRX status between the network node and wireless device.

According to one aspect of the disclosure, a network node is provided. The network node includes processing circuitry configured to: cause transmission of a Discontinuous Reception, DRX, configuration to a wireless device using communication layer 3 signaling, cause transmission of an indication to the wireless device to trigger activation at one of communication layer 1 and communication layer 2 of the DRX configuration, and optionally determine whether the wireless device has activated the DRX configuration.

According to one or more embodiments of this aspect, the processing circuitry is further configured to determine whether the wireless device is performing a predetermined procedure, the DRX configuration being provided to the wireless device using communication layer 3 signaling before the predetermined procedure. According to one or more embodiments of this aspect, the predetermined procedure is a contention resolution procedure for random access. According to one or more embodiments of this aspect, the indication triggers activation at communication layer 2 using a Contention Resolution Identity Medium Access Control Control Element, CRI MAC CE, that triggers an action associated with the DRX configuration.

According to one or more embodiments of this aspect, the indication triggers activation at communication layer 2 using a Medium Access Control, MAC, Control Element, CE, that indicates that the DRX configuration is to be activated. According to one or more embodiments of this aspect, the processing circuitry is further configured to cause transmission of another indication to the wireless device to trigger deactivation of the DRX configuration at communication layer 2 using a first Medium Access Control, MAC, Control Element, CE that indicates the DRX configuration is to be deactivated.

According to one or more embodiments of this aspect, the indication triggers activation at communication layer 2 using a second MAC CE that indicates that the DRX configuration is to be activated. According to one or more embodiments of this aspect, the indication triggers activation at communication layer 1 using Downlink Control Information, DCI, that indicates that the DRX configuration is to be activated. According to one or more embodiments of this aspect, the DCI includes a bit dedicated to indicate whether to activate a DRX configuration.

According to another aspect of the disclosure, a wireless device is provided. The wireless device includes processing circuitry configured to: receive a Discontinuous Reception, DRX, configuration using communication layer 3 signaling, receive an indication to trigger activation at one of communication layer 1 and communication layer 2 of the DRX configuration, and activate the DRX configuration based at least in part on the indication.

According to one or more embodiments of this aspect, the processing circuitry is further configured to perform a predetermined procedure after configuration of the DRX configuration. According to one or more embodiments of this aspect, the predetermined procedure is a contention resolution procedure for random access.

According to one or more embodiments of this aspect, the indication triggers activation at communication layer 2 using a Contention Resolution Identity Medium Access Control Control Element, CRI MAC CE, that triggers an action associated with the DRX configuration.

According to one or more embodiments of this aspect, the indication triggers activation at communication layer 2 using a Medium Access Control, MAC, Control Element, CE, that indicates that the DRX configuration is to be activated. According to one or more embodiments of this aspect, the processing circuitry is further configured to receive another indication that triggers deactivation of the DRX configuration at communication layer 2 using a first Medium Access Control, MAC, Control Element, CE that indicates the DRX configuration is to be deactivated. According to one or more embodiments of this aspect, the indication triggers activation at communication layer 2 using a second MAC CE that indicates that the DRX configuration is to be activated.

According to one or more embodiments of this aspect, the indication triggers activation at communication layer 1 using Downlink Control Information, DCI, that indicates that the DRX configuration is to be activated. According to one or more embodiments of this aspect, the DCI includes a bit dedicated to indicate whether to activate a DRX configuration.

According to another aspect of the disclosure, a method implemented in a network node is provided. Transmission of a Discontinuous Reception, DRX, configuration to a wireless device using communication layer 3 signaling is caused. Transmission of an indication to the wireless device to trigger activation at one of communication layer 1 and communication layer 2 of the DRX configuration is caused. A determination whether the wireless device has activated the DRX configuration is optionally performed.

According to one or more embodiments of this aspect, a determination whether the wireless device is performing a predetermined procedure is performed where the DRX configuration is provided to the wireless device using communication layer 3 signaling before the predetermined procedure. According to one or more embodiments of this aspect, the predetermined procedure is a contention resolution procedure for random access. According to one or more embodiments of this aspect, the indication triggers activation at communication layer 2 using a Contention Resolution Identity Medium Access Control Control Element, CRI MAC CE, that triggers an action associated with the DRX configuration.

According to one or more embodiments of this aspect, the indication triggers activation at communication layer 2 using a Medium Access Control, MAC, Control Element, CE, that indicates that the DRX configuration is to be activated. According to one or more embodiments of this aspect, transmission of another indication to the wireless device to trigger deactivation of the DRX configuration at communication layer 2 using a first Medium Access Control, MAC, Control Element, CE that indicates the DRX configuration is to be deactivated is caused.

According to one or more embodiments of this aspect, the indication triggers activation at communication layer 2 using a second MAC CE that indicates that the DRX configuration is to be activated. According to one or more embodiments of this aspect, the indication triggers activation at communication layer 1 using Downlink Control Information, DCI, that indicates that the DRX configuration is to be activated. According to one or more embodiments of this aspect, the DCI includes a bit dedicated to indicate whether to activate a DRX configuration.

According to another aspect of the disclosure, a method implemented in a wireless device is provided. A Discontinuous Reception, DRX, configuration is received using communication layer 3 signaling. An indication to trigger activation at one of communication layer 1 and communication layer 2 of the DRX configuration is received. The DRX configuration is activated based at least in part on the indication.

According to one or more embodiments of this aspect, a predetermined procedure is performed after configuration of the DRX configuration. According to one or more embodiments of this aspect, the predetermined procedure is a contention resolution procedure for random access. According to one or more embodiments of this aspect, the indication triggers activation at communication layer 2 using a Contention Resolution Identity Medium Access Control Control Element, CRI MAC CE, that triggers an action associated with the DRX configuration.

According to one or more embodiments of this aspect, the indication triggers activation at communication layer 2 using a Medium Access Control, MAC, Control Element, CE, that indicates that the DRX configuration is to be activated. According to one or more embodiments of this aspect, another indication is received that triggers deactivation of the DRX configuration at communication layer 2 using a first Medium Access Control, MAC, Control Element, CE that indicates the DRX configuration is to be deactivated. According to one or more embodiments of this aspect, the indication triggers activation at communication layer 2 using a second MAC CE that indicates that the DRX configuration is to be activated.

According to one or more embodiments of this aspect, the indication triggers activation at communication layer 1 using Downlink Control Information, DCI, that indicates that the DRX configuration is to be activated. According to one or more embodiments of this aspect, the DCI includes a bit dedicated to indicate whether to activate a DRX configuration.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
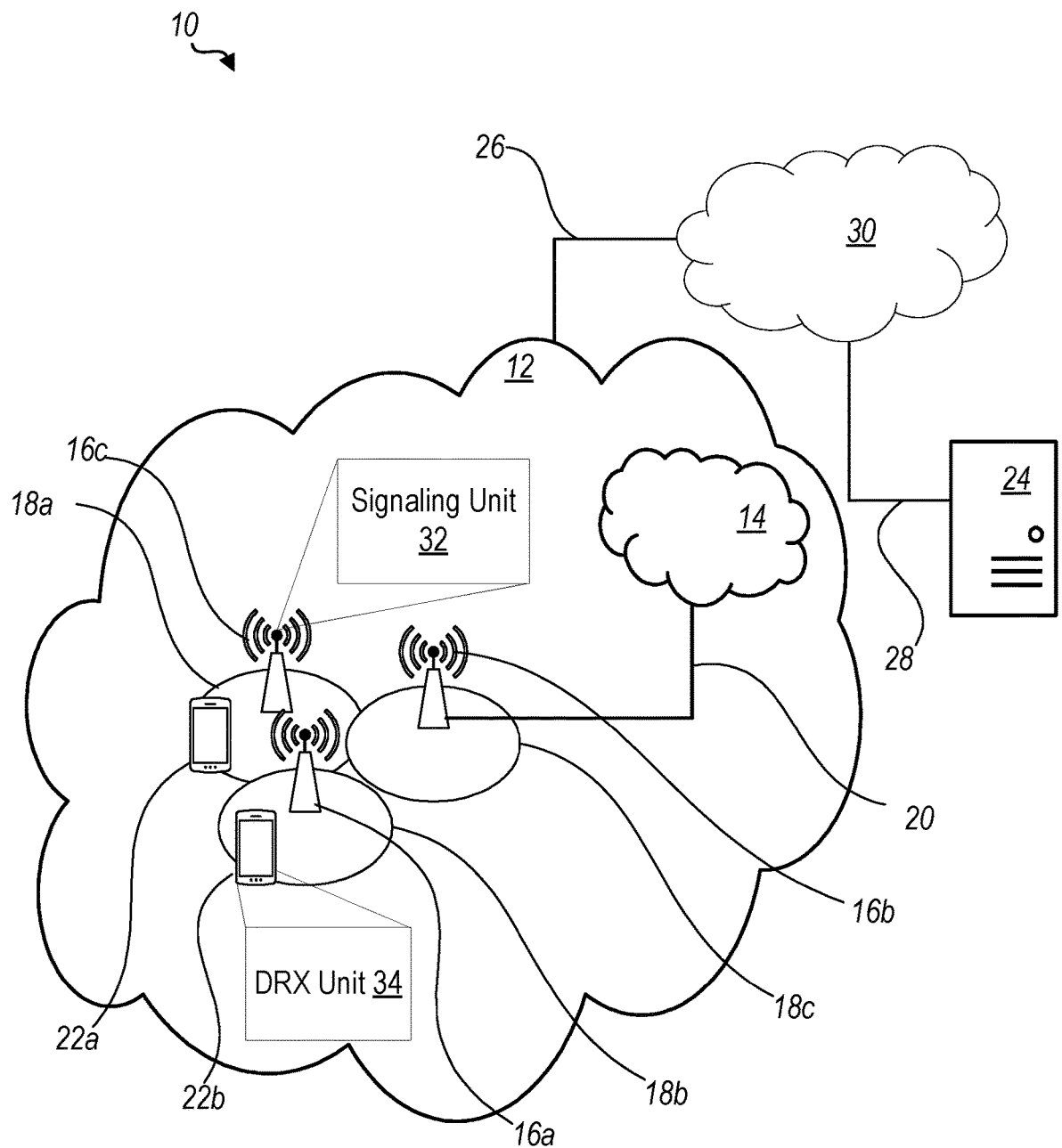
FIG. 1 is a schematic diagram of an exemplary network architecture illustrating a communication system connected via an intermediate network to a host computer according to the principles in the present disclosure.

Before describing in detail exemplary embodiments, it is noted that the embodiments reside primarily in combinations of apparatus components and processing steps related to discontinuous reception (DRX) control using at least in part communication layer 1 and/or layer 2 signaling for helping avoid DRX misalignment. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

A channel may generally be a logical or physical channel. A channel may comprise and/or be arranged on one or more carriers, in particular a plurality of subcarriers. A wireless communication network may comprise at least one network node, in particular a network node as described herein. A terminal connected or communicating with a network may be considered to be connected or communicating with at least one network node, in particular any one of the network nodes described herein.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to describe wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide discontinuous reception (DRX) control using at least in part communication layer 1 and/or layer 2 signaling for helping reduce misalignment of a DRX state between the network node and wireless device and/or helping align a DRX status between the network node and wireless device.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a signaling unit 32. A wireless device 22 is configured to include a DRX unit 34.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to process, determine, communicate, receive, transmit, forward, relay, store, etc., information related to DRX control using at least in part communication layer 1 signaling and/or communication layer 2 signaling for helping avoid DRX misalignment.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include signaling unit 32 configured to perform one or more network node 16 functions described herein such as with respect to discontinuous reception DRX control using at least in part communication layer 1 signaling and/or communication layer 2 signaling for helping avoid DRX misalignment.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a DRX unit 34 configured to perform one or more wireless device 22 functions described herein such as with respect to discontinuous reception (DRX) control using at least in part communication layer 1 signaling and/or communication layer 2 signaling for helping reduce misalignment of a DRX state between the network node and wireless device and/or helping align a DRX status between the network node and wireless device.

Figure 2:
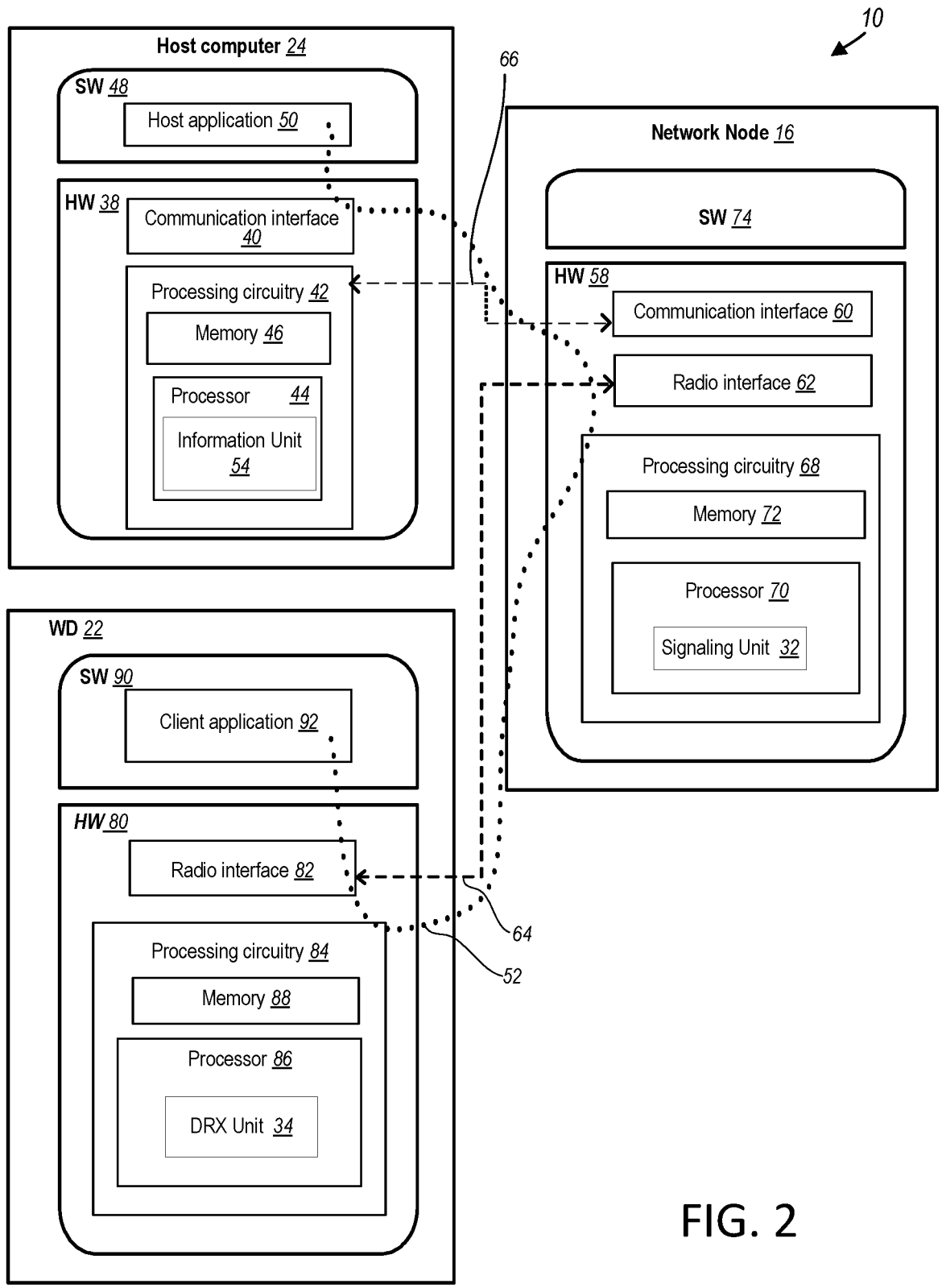
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as DRX unit 34, and signaling unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 3, 4:
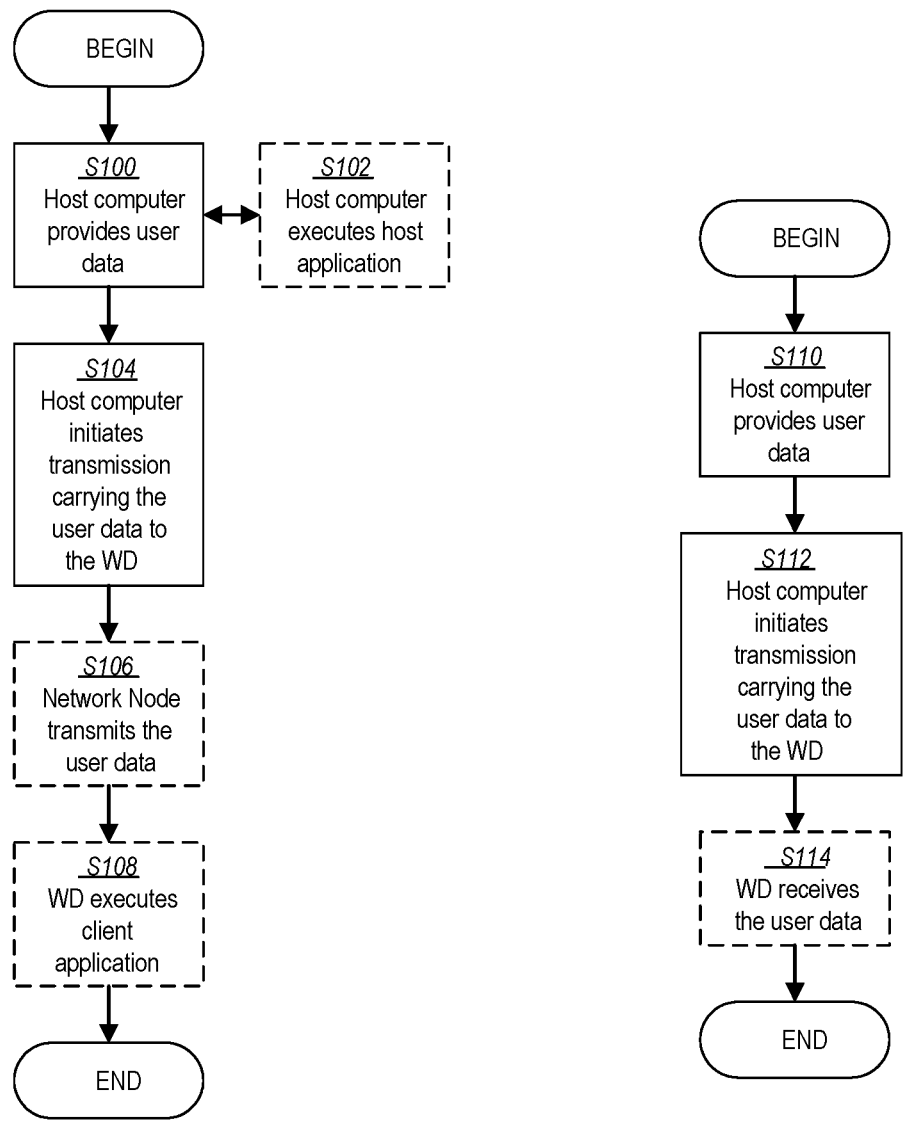
FIG. 3 is a flowchart illustrating exemplary methods implemented in a communication system including a host computer, a network node and a wireless device for executing a client application at a wireless device according to some embodiments of the present disclosure.
FIG. 4 is a flowchart illustrating exemplary methods implemented in a communication system including a host computer, a network node and a wireless device for receiving user data at a wireless device according to some embodiments of the present disclosure.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 5:
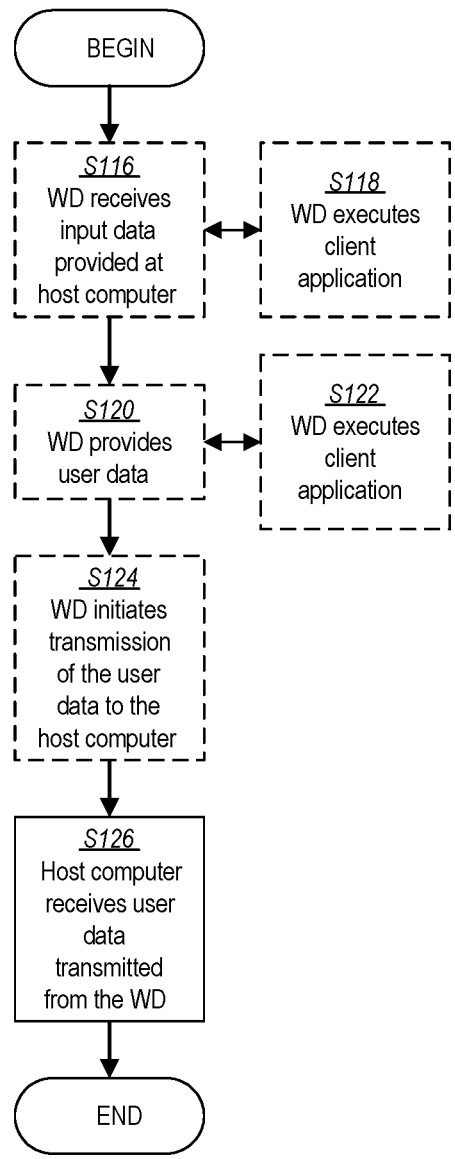
FIG. 5 is a flowchart illustrating exemplary methods implemented in a communication system including a host computer, a network node and a wireless device for receiving user data from the wireless device at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 6:
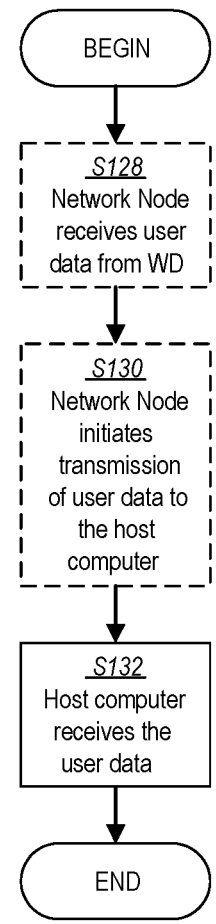
FIG. 6 is a flowchart illustrating exemplary methods implemented in a communication system including a host computer, a network node and a wireless device for receiving user data at a host computer according to some embodiments of the present disclosure.

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
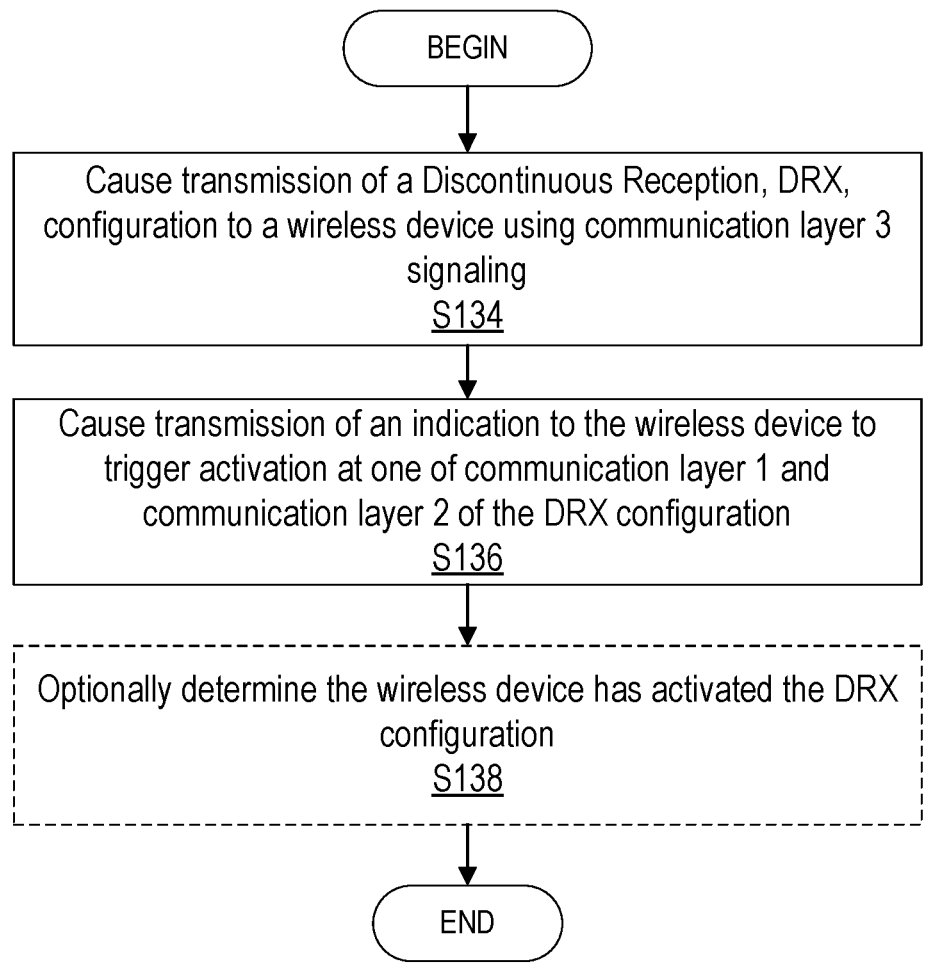
FIG. 7 is a flowchart of an exemplary process in a network node according to some embodiments of the present disclosure.

FIG. 7 is a flowchart of an exemplary process in a network node 16 according to one or more embodiments of the present disclosure. One or more Blocks and/or functions performed by network node 16 may be performed by one or more elements of network node 16 such as by signaling unit 32 in processing circuitry 68, processor 70, radio interface 62, etc. In one or more embodiments, network node 16 such as via one or more of processing circuitry 68, processor 70, communication interface 60 and radio interface 62 is configured to cause (Block S134) transmission of a Discontinuous Reception, DRX, configuration to a wireless device 22 using communication layer 3 signaling, as described herein. In one or more embodiments, network node 16 such as via one or more of processing circuitry 68, processor 70, communication interface 60 and radio interface 62 is configured to cause (Block S136) transmission of an indication to the wireless device 22 to trigger activation at one of communication layer 1 and communication layer 2 of the DRX configuration, as described herein. In one or more embodiments, network node 16 such as via one or more of processing circuitry 68, processor 70, communication interface 60 and radio interface 62 is configured to optionally determining (Block S138) whether the wireless device 22 has activated the DRX configuration.

According to one or more embodiments, the processing circuitry 68 is further configured to determine whether the wireless device 22 is performing a predetermined procedure, the DRX configuration being provided to the wireless device 22 using communication layer 3 signaling before the predetermined procedure. According to one or more embodiments, the predetermined procedure is a contention resolution procedure for random access. According to one or more embodiments, the indication triggers activation at communication layer 2 using a Contention Resolution Identity Medium Access Control Element, CRI MAC CE, that triggers an action associated with the DRX configuration.

According to one or more embodiments, the indication triggers activation at communication layer 2 using a Medium Access Control, MAC, Control Element, CE, that indicates that the DRX configuration is to be activated. According to one or more embodiments, the processing circuitry 68 is further configured to cause transmission of another indication to the wireless device 22 to trigger deactivation of the DRX configuration at communication layer 2 using a first Medium Access Control, MAC, Control Element, CE that indicates the DRX configuration is to be deactivated. In one or more embodiments, the MAC CE is transmitted in the same DL transmission that carriers the RRC reconfiguration that contains the DRX configuration.

According to one or more embodiments, the indication triggers activation at communication layer 2 using a second MAC CE that indicates that the DRX configuration is to be activated. According to one or more embodiments, the indication triggers activation at communication layer 1 using Downlink Control Information, DCI, that indicates that the DRX configuration is to be activated. According to one or more embodiments, the DCI includes a bit dedicated to indicate whether to activate a DRX configuration.

Figure 8:
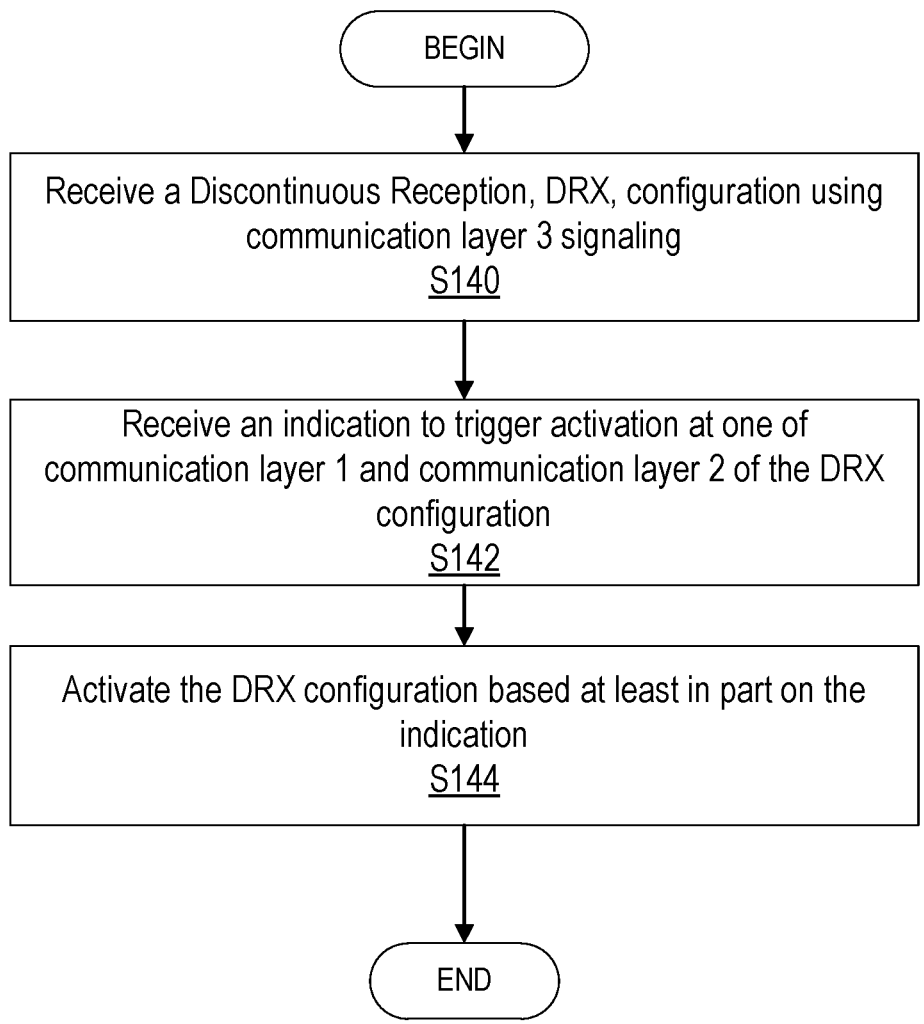
FIG. 8 is a flowchart of an exemplary process in a wireless device according to some embodiments of the present disclosure.

FIG. 8 is a flowchart of an exemplary process in a wireless device 22 according to some embodiments of the present disclosure. One or more Blocks and/or functions performed by wireless device 22 may be performed by one or more elements of wireless device 22 such as by DRX unit 34 in processing circuitry 84, processor 86, radio interface 82, etc. In one or more embodiments, wireless device 22 such as via one or more of processing circuitry 84, processor 86 and radio interface 82 is configured to receive (Block S140) a Discontinuous Reception, DRX, configuration using communication layer 3 signaling, as described herein. In one or more embodiments, wireless device 22 such as via one or more of processing circuitry 84, processor 86 and radio interface 82 is configured to receive (Block S142) an indication to trigger activation at one of communication layer 1 and communication layer 2 of the DRX configuration, as described herein. In one or more embodiments, wireless device 22 such as via one or more of processing circuitry 84, processor 86 and radio interface 82 is configured to activate (Block S144) the DRX configuration based at least in part on the indication.

According to one or more embodiments, the processing circuitry 84 is further configured to perform a predetermined procedure after configuration of the DRX configuration. According to one or more embodiments, the predetermined procedure is a contention resolution procedure for random access. According to one or more embodiments, the indication triggers activation at communication layer 2 using a Contention Resolution Identity Medium Access Control Element, CRI MAC CE, that triggers an action associated with the DRX configuration.

According to one or more embodiments, the indication triggers activation at communication layer 2 using a Medium Access Control, MAC, Control Element, CE, that indicates that the DRX configuration is to be activated. According to one or more embodiments, the processing circuitry 84 is further configured to receive another indication that triggers deactivation of the DRX configuration at communication layer 2 using a first Medium Access Control, MAC, Control Element, CE that indicates the DRX configuration is to be deactivated. In one or more embodiments, the MAC CE is transmitted in the same DL transmission that carriers the RRC reconfiguration that contains the DRX configuration. According to one or more embodiments, the indication triggers activation at communication layer 2 using a second MAC CE that indicates that the DRX configuration is to be activated.

According to one or more embodiments, the indication triggers activation at communication layer 1 using Downlink Control Information, DCI, that indicates that the DRX configuration is to be activated. According to one or more embodiments, the DCI includes a bit dedicated to indicate whether to activate a DRX configuration.

Having described the general process flow of arrangements of the disclosure and having provided examples of hardware and software arrangements for implementing the processes and functions of the disclosure, the sections below provide details and examples of arrangements for helping reduce misalignment of a DRX state between the network node and wireless device and/or helping align a DRX status between the network node and wireless device.

Embodiments provide discontinuous reception (DRX) control using at least in part communication layer 1 and/or layer 2 signaling for helping reduce misalignment of a DRX state between the network node 16 and wireless device 22 and/or helping align a DRX status between the network node 16 and wireless device 22.

Method 1:
DRX Activation MAC CE

Figure 9:
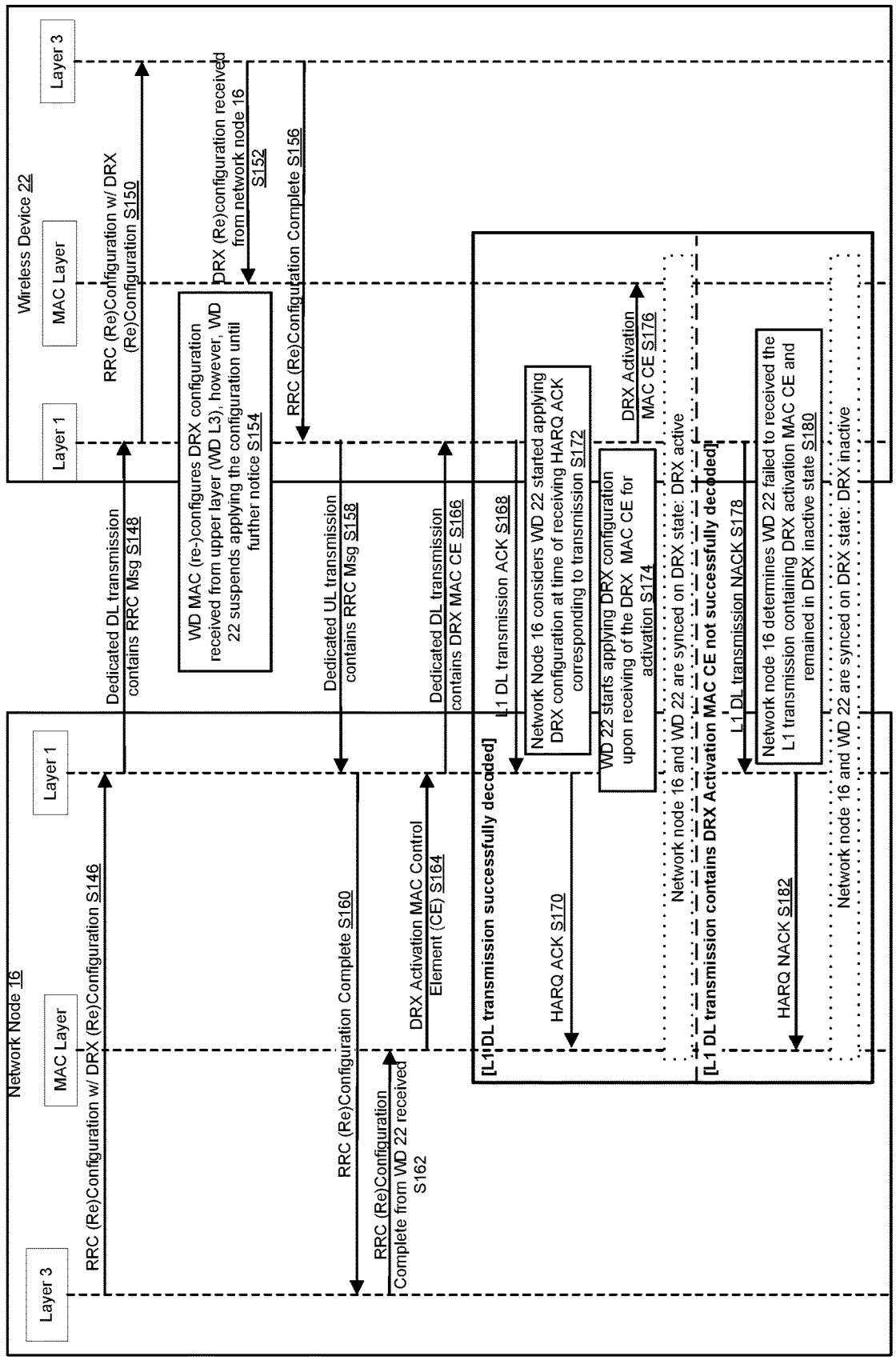
FIG. 9 is a signaling diagram for DRX activation/deactivation control according to some embodiments of the present disclosure.

FIG. 9 is a signaling diagram for DRX activation/deactivation control in accordance with some embodiments of the disclosure such as in accordance with method 1. The network node 16 provides such as via processing circuitry 68 and/or signaling unit 32 the DRX configuration to wireless device 22 via RRC reconfiguration message. For example, the network node 16 communicates (Block S146) such as via processing circuitry 68 and/or signaling unit 32 a RRC (re)configuration message with the DRX (re)configuration from communication layer 3 (also referred to as "layer 3") to communication layer 1 (also referred to as "layer 1") at network node 16. As used herein, "(re)configuration" corresponds to reconfiguration or configuration. Network node 16 transmits (Block S148) such as via radio interface 62 and/or signaling unit 32 a dedicated DL transmission containing/including the RRC message with the DRX (re)configuration to the wireless device 22. Wireless device 22 receives the DL transmission and communicates (Block S150) such as via processing circuitry 84 and/or DRX unit 34 RRC (re)configuration with the DRX (re) configuration from layer 1 to layer 3.

Wireless device 22 communicates (Block S152) such as via processing circuitry 84 and/or DRX unit 34 the received DRX (re)configuration received from the network node 16 to the MAC layer (i.e., communication layer 2) at wireless device 22. Wireless device 22 (re)configures (Block S154) such a via the processing circuitry 84 and/or DRX unit 34 the DRX configuration received from the upper layer (e.g., layer 3) and also suspends applying the DRX configuration until triggered to do so. Wireless device 22 communicates (Block S156) such as via the processing circuitry 84 and/or DRX unit 34 a RRC (re)configuration complete message (i.e., type of RRC message) from layer 3 to layer 1 at the wireless device 22. Wireless device 22 transmits (Block S158) such as via DRX unit 34 and/or radio interface 82 the RRC (re)configuration complete message using dedicated UL transmission, i.e., the dedicated UL transmission contains/includes the RRC (re)configuration complete message. For example, If the RRC reconfiguration message is received by the wireless device 22 successfully, the wireless device 22 may then transmits a corresponding RRC reconfiguration complete message to the network node 16 where at the same time the DRX configuration is pushed to lower layer but suspended from applying the DRX configuration.

Network node 16 receives (Block S160) such as via radio interface 62 the dedicated UL transmission containing/including the RRC (re)configuration complete message. Network node communicates (Block S162) such as via processing circuitry 68 and/or signaling unit 32 the RRC (re)configuration complete message to MAC at the network node 16. Network node 16 communicates (Block S164) a DRX MAC control element (CE) (e.g., indication) from the MAC layer (i.e., communication layer 2/layer 3) to layer 1 at the network node 16 such as to active the DRX configuration at the wireless device. Network node 16 transmits (Block S166) such as via radio interface 62 and/or signaling unit 32 the DRX MAC CE in a dedicated DL transmission. For example, after the RRC reconfiguration complete message has been received by the network node 16, the network node 16 may send out a MAC CE to activate DRX where the wireless device 22 may only apply the DRX configuration when the MAC CE is received which explicitly indicates the activation of DRX.

If the layer 1 (L1) transmission with the DRX MAC CE was successfully decoded by the wireless device, the wireless device transmits (Block S168) such as via radio interface 82 and/or DRX unit 34 a L1 DL transmission acknowledgement (ACK) indicating the successful decoding. Network node 16 receives the L1 DL transmission ACK on layer 1 and communicates such as via processing circuitry 68 and/or signaling unit 32 the L1 DL transmission ACK (i.e., HARQ ACK) to the MAC layer at the network node 16. The network node 16 may consider/assume/determine (Block S172) that the wireless device 22 started applying the DRX configuration at the time of receiving the HARQ ACK corresponding to the transmission.

Wireless device 22 starts (Block S174), via processing circuitry 84 and/or DRX unit 34, applying the DRX configuration upon receiving of the DRX MAC CE for activation. In other words, in one or more embodiments, layer 1 and/or layer 2 is used to trigger activation of the DRX configuration in Block S174. Wireless device 22 communicates (Block S176), via processing circuitry 84 and/or DRX unit 34, the DRX MAC CE for activation to the MAC layer at the wireless device 22. In one or more embodiments, the DRX MAC CE corresponds to an indication to trigger activation at the MAC layer (i.e., communication layer 2) of the DRX/DRX configuration. The network node 16 and wireless device 22 are synced on the DRX state: DRX active.

If the layer 1 (L1) transmission containing the DRX MAC CE activation was not successfully decoded by the wireless device 22, the wireless device 22 communicates (Block S178), via the processing circuitry 84 and/or DRX unit 34, an L1 DL transmission negative acknowledgement (NACK) to the network node 16. The network node 16 receives (Block S180) the L1 DL transmission NACK on layer 1 and determines, based at least in part on the received NACK, that the wireless device 22 failed to receive the L1 transmission containing the DRX activation MAC CE and remained in the DRX inactive state. The network node 16 communicates (Block S182), via processing circuitry 68 and/or signaling unit 32, the HARQ NACK from layer 1 to the MAC layer at the network node 16. There network node 16 and wireless device 22 are synced on DRX state: DRX inactive.

In other words, method 1 advantageously shifts and/or moves the DRX activation procedure from L3 signaling (RRC reconfiguration) to MAC layer signaling, which has lower processing delay than L3 and has faster feedback than L3 (L1 HARQ vs L3 signaling). Therefore, leading to significantly reduced probability of DRX state misalignment and potentially the duration of DRX state misalignment between the network node 16 and wireless device 22.

Furthermore, in case the DRX activation MAC CE was not received by the wireless device 22 such as due to poor channel condition, the HARQ feedback (NACK) received by the network node 16 for the DL transmission contains MAC CE that can be used as a criterion to further prevent activation of DRX from the network node 16 side. In this way, the configured DRX setting are initially deactivated at the wireless device 22 side upon configuration until the wireless device 22 receives the DRX Activation MAC CE. The network node 16 may activate the configured DRX setting upon receiving the ACK feedback for DRX Activation MAC CE. Typically, the network node 16 can take into account the HARQ feedback delay when activating the DRX, thereby providing an even accurate DRX state alignment.

Further, when the MAC entity, i.e., wireless device 22, receives a DRX Activation MAC CE on a serving cell, the MAC entity may indicate to the lower layers the information regarding the DRX Activation MAC CE.

Method 2

MAC CE Instructs the Wireless Device to Apply or not Apply DRX Based on its Content In method 2, a MAC CE is sent to the wireless device 22 together with L3 DRX configuration message during RRC configuration or reconfiguration in order to instruct the wireless device 22 to not apply DRX yet, i.e., to at least temporarily suspend applying the DRX configuration. When the wireless device 22 receives the MAC CE with the L3 DRX configuration, the wireless device 22 may at least temporarily suspend applying the DRX configuration until the wireless device 22 receives another MAC CE with the instruction to start applying the DRX configuration. Comparing to method 2 to method 1, method 2 may be considered more wireless communication protocol friendly, as method 2 follows existing wireless communication protocols such as 3GPP standards that when a wireless device 22 receives RRC configuration, the wireless device 22 applies the configuration from the L3 perspective, except that another procedure is introduced at the MAC layer to further control the DRX state.

Figure 10:
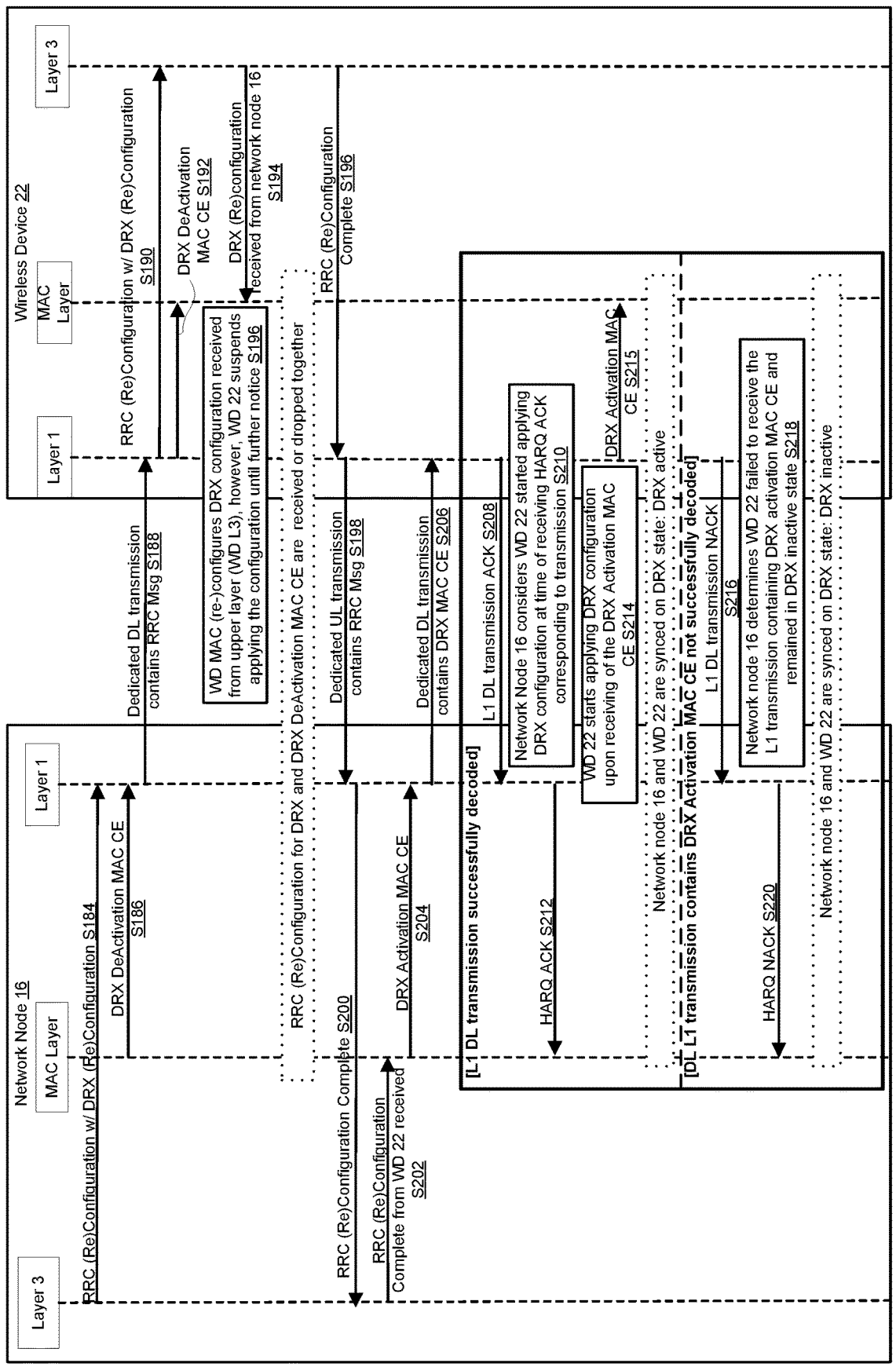
FIG. 10 is another signaling diagram for DRX activation/deactivation control according to some embodiments of the present disclosure.

FIG. 10 is another signaling diagram for DRX activation/deactivation control in accordance with some embodiments of the disclosure such as in accordance with method 2. The network node 16 communicates (Block S184), via processing circuitry 68 and/or signaling unit 32, a RRC (re)configuration with DRX (re)configuration message from layer 3 to layer 1 at the network node 16. Network node 16 communicates (Block S186), via processing circuitry 68 and/or signaling unit 32, a DRX deactivation MAC CE (e.g., indication) from the MAC layer to layer 1. Network node 16 transmits (Block S188), via radio interface 62 and/or signaling unit 32, dedicated DL transmission containing/including the RRC message including the DRX deactivation MAC CE. Wireless device 22 communicates (Block S190), via processing circuitry 84 and/or DRX unit 34, the RRC (re)configuration with DRX (re)configuration from layer 1 to layer 3. Wireless device 22 communicates (Block S192), via processing circuitry 84 and/or DRX unit 34, the DRX deactivation MAC CE. In one or more embodiments, the DRX deactivation MAC CE corresponds to an indication to trigger at least temporary deactivation at the MAC layer (i.e., communication layer 2) of the DRX/DRX configuration. The wireless device 22, at the MAC layer, (re)configures (Block S194) DRX configuration based at least in part on the received DRX configuration from the upper layer where the wireless device 22 at least temporarily suspends applying the configuration. Therefore, the RRC (re)configuration for DRX and DRX deactivation MAC CE are received and/or dropped together, i.e., the wireless device 22 and network node 16 are in sync.

The wireless device 22 communicates (Block S196), via processing circuitry 84 and/or DRX unit 34, a RRC (re)configuration complete message from layer 3 to layer 1 at the wireless device 22. The wireless device 22 transmits (Block S198), via radio interface 82, dedicated UL transmission containing the RRC (re)configuration complete message. The network node 16 receives, via radio interface 62, the dedicated UL transmission and communicates (Block S200), via processing circuitry 68 and/or signaling unit 32, the RRC (re)configuration complete message from layer 1 to layer 3 at network node 16. The network node 16 communicates (Block S202), via processing circuitry 68 and/or signaling unit 32, RRC (re)configuration complement from the wireless device 22 from layer 3 to the MAC layer of the network node 16. The network node 16 communicates (Block S204), via processing circuitry 68 and/or signaling unit 32, the DRX activation MAC CE (e.g., indication) from the MAC layer to layer 1. Network node 16 transmits (Block S206), via radio interface 62, the DRX activation MAC CE to the wireless device 22 to trigger activation of the DRX configuration.

If the L1 DL transmission successfully decodes the dedicated DL transmission containing the DRX MAC CE, the wireless device 22 transmits (S208), via radio interface 82, the L1 DL transmission ACK to the network node 16 to acknowledge the successfully decoding. The network node 16 considers/determines/assumes (Block S210) the wireless device 22 has started applying the DRX configuration at the time of receiving the HARQ ACK corresponding to the transmission. The network node 16 communicates (Block S212), via processing circuitry 68 and/or signaling unit 32, the HARQ ACK from layer 1 to the MAC layer. The wireless device 22 may start applying (Block S214), via processing circuitry 84 and DRX unit 34, the DRX configuration upon receiving of the DRX activation MAC CE. Wireless device 22 communicates (S215), via processing circuitry 84 and/or DRX unit 34, the DRX activation MAC CE (e.g., indication) from layer 1 to the MAC layer at the wireless device 22. In one or more embodiments, the DRX activation MAC CE corresponds to an indication to trigger activation at the MAC layer (i.e., communication layer 2) of the DRX/DRX configuration. The network node 16 and wireless device 22 are synced on DRX state: DRX active.

If the L1 DL transmission fails to successfully decode the dedicated DL transmission containing the DRX MAC CE, the wireless device 22 transmits (Block S216), via radio interface 82, a L1 DL transmission NACK message to the network node indicates the unsuccessful decoding or non-receipt of the transmission. The network node 16 determines (S218), via processing circuitry 68 and/or signaling unit 32, wireless device 22 failed to receive the L1 transmission containing DRX activation MAC CE and remained in the DRX inactive state. The network node 16 communicates (Block S220), via processing circuitry 68 and/or signaling unit 32, a HARQ NACK from layer 1 to layer 3. The network node 16 and wireless device 22 are synced on DRX state: DRX inactive.

Method 3

An Addition Bit in DCI Indicates DRX Activation

In method 3, when DRX configurations are sent to the wireless device 22 in the RRC reconfiguration message, an additional bit in DCI is set to "DRX deactivated" and sent to wireless device 22. Both the network node 16 and wireless device 22 may stay in DRX inactive state at this time. In one or more embodiments, the extra bit may be a dedicated extra bit in the DCI to carry DRX activation/deactivation information where the dedicated extra bit may be statically added to the DCI message. After the RRC reconfiguration complete message is received by the network node 16 indicating that DRX configuration has been successfully received (i.e., successfully decoded) by the wireless device 22, a DCI is sent to the wireless device 22 with an additional bit set to "DRX activated" to explicitly signal DRX activation. Then both the network node 16 and the wireless device 22 may be synchronized on DRX state.

From the wireless device 22 side, if its DRX is already activated and the wireless device 22 receives a DCI with the DRX activated bit, then the wireless device 22 may continue being in the DRX state. In this case, the wireless device 22 may (re)start its inactivity timer after receiving the DCI. If the wireless device 22 is not in DRX and receives the DCI with the DRX activated bit, then the wireless device 22 may activate its DRX cycle and start its inactivity timer since the wireless device 22 has successfully received the DCI. If the wireless device 22 is in its DRX state and receives a DCI with DRX deactivated bit, then the wireless device 22 may deactivate its DRX and remain awake until it receives a DCI with an activation DRX bit. If the wireless device 22 is not in DRX and receives the DCI with the DRX deactivated bit, then the wireless device 22 ignores the bit and remains in the awake state until the wireless device 22 receives a DCI with an activation DRX bit.

Therefore, even if the wireless device 22 failed to receive the DCI, the wireless device 22 may remain in its previous DRX state. The network node 16 may have to rely on the wireless device 22 HARQ feedback in order to determine if the wireless device 22 has successfully received the DCI. If the network node 16 receives a DTX in the HARQ feedback, then the network node 16 may assume that the wireless device 22 did not receive the DCI and may resend the DCI again with the same DCI DRX bit. In one or more embodiments, even if the wireless device 22 receives duplicate DCI, the duplicate DCI may have little to no impact at the wireless device 22. For example, any consecutive DCIs received by the wireless device 22 with the same DRX state bit value may imply no change in the DRX state, thereby may have little to no impact at the wireless device 22.

A possible failure issue can be foreseen where the wireless device 22 did not receive the DCI but the network node 16 assumes that the wireless device 22 did receive the DCI (i.e., successfully decode the DCI). This situation may occur if the network node 16 detects a HARQ ACK or NACK even though the wireless device 22 did not send any HARQ feedback. However, the probability of this situation occurring is small. Either way, this case may lead to a DRX mis-match that can be recovered by transmitting to the wireless device 22 in the next on-duration.

Figure 11:
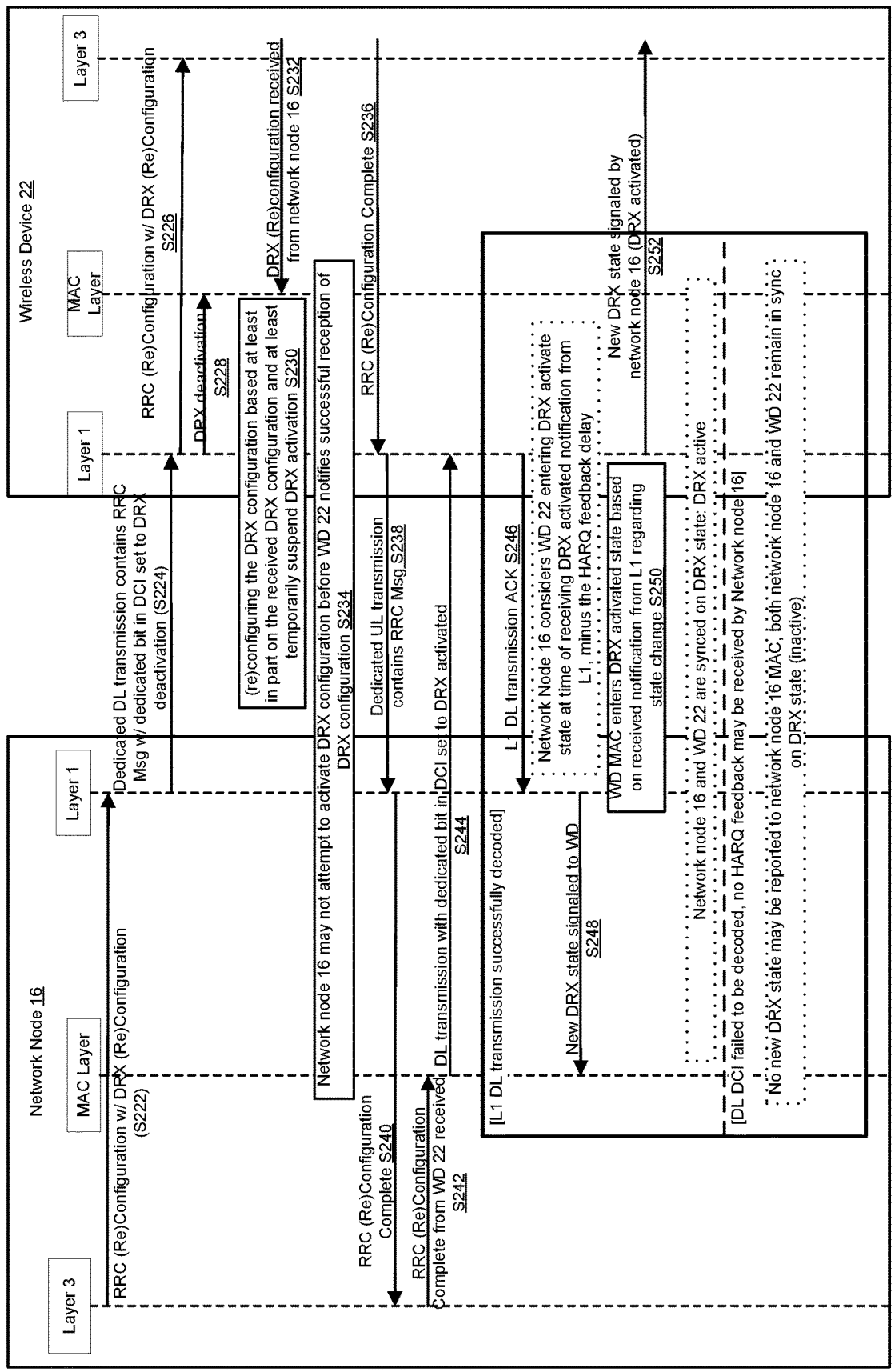
FIG. 11 is another signaling diagram for DRX activation/deactivation control according to some embodiments of the present disclosure.

FIG. 11 is another signaling diagram for DRX activation/deactivation control in accordance with some embodiments of the disclosure such as in accordance with method 3. The network node 16 communicates (Block S220), via processing circuitry 68 and/or signaling unit 32, RRC (re)configuration with DRX (re)configuration from layer 3 to layer 1 at network node 16. The network node 16 transmits (Block S224), via radio interface 62, a dedicated DL transmission containing an RRC message with at least one dedicated bit (e.g., indication) in the DCI set to DRX deactivation. In one or more embodiments, the dedicated bit corresponds to an indication to trigger deactivation at communication layer 1 of the DRX/DRX configuration. The wireless device 22 receives the DL transmission via radio interface 82, and communicates (Block S226), via processing circuitry 68 and/or signaling unit 32, the RRC message with RRC (re)configuration and DRX (re)configuration from layer 1 to layer 3 at wireless device 22. The wireless device 22 communicates from layer 1 to the MAC layer (Block S228), via processing circuitry 84 and/or DRX unit 34, the DRX deactivation (e.g., indication) signaled by the network node 16. The wireless device 22, in the MAC layer (re)configures (Block S230), via processing circuitry 84 and/or DRX unit 34, the DRX configuration based at least in part on the DRX configuration received from the upper layer(s) and at least temporarily suspends applying the configuration such as until the DRX is triggered and/or activated as described herein. For example, in one or more embodiments, WD 22 MAC (re)configures DRX configuration based at least in part on DRX (re)configuration received from upper layer (WD L3), however, WD 22 suspends applying the configuration until further notice.

Wireless device communicates from layer 3 to the MAC layer at wireless device 22 (Block S232), via processing circuitry 84 and/or DRX unit 34, DRX (re)configuration received from the network node 16. In one or more embodiments, network node 16 may not attempt (Block S234), via processing circuitry 68 and/or signaling unit 32, to activate DRX configuration before wireless device 22 notifies the network node 16 of successful reception of DRX configuration. Wireless device 22 16 communicates from layer 3 to layer 1 at wireless device 22 (Block S236), via processing circuitry 84 and/or DRX unit 34, an RRC (re)configuration complete message indicates that DRX configuration is complete. Wireless device 22 transmits (Block S238), via radio interface 82 and/or DRX unit 34, dedicate UL transmission containing an RRC message. Network node 16 receives, via radio interface 62, the dedicated UL transmission, and communicates (Block S240) the RRC (re)configuration complete message from layer 1 to layer 3. Network node 16 communicates (Block S242), via processing circuitry 68 and or signaling unit 32, the RRC (re)configuration complete from layer 3 to the MAC layer. Network node 16 transmits (Block S244), via radio interface 62 and/or signaling unit 32, DL transmission with a dedicated bit in DCI set to DRX activated to activate/trigger DRX at the wireless device 22. In one or more embodiments, the dedicated bit corresponds to an indication to trigger activation at communication layer 1 of the DRX/DRX configuration.

If L1 DL transmission is successfully decoded at the wireless device 22, via processing circuitry 84 and/or DRX unit 34, the wireless device 22 transmits (Block S246), via radio interface and/or DRX unit 34, a L1 DL transmission ACK to the network node 16. Network node 16 considers wireless device 22 to be entering DRX activate state at the time of receiving a DRX activated notification from L1 minus the HARQ feedback delay. The network node 16 communicates (Block S248), via processing circuitry 68 and/or signaling unit 32, the new DRX state signaled to the wireless device 22 from layer 1 to the MAC layer at the network node 16.

The wireless device 22, at the MAC layer, is configured to enter (Block S250), via processing circuitry 84 and/or DRX unit 34, the DRX activated state based at least in part on a received notification from L1 regarding the state change. The wireless device 22 communicates (Block S252), via processing circuitry 84 and/or DRX unit 34, the new DRX state signaled by network node 16 (DRX activated) from layer 1 to layer 3 at the wireless device 22. The network node 16 and wireless device 22 are synced on DRX state: DRX active.

If the DL DCI fails to be decoded by wireless device 22, no HARQ feedback may be received by the network node 16. Therefore, no new DRX state may be reported to the MAC layer at network node 16 where both the network node 16 and/or wireless device 22 remain in sync on DRX state (inactive).

Method 4

A Predetermined Timing Point is Provided in the L3 Procedure Between Wireless Device 22 and Network Node 16 for Applying DRX Configuration In the case of Non-Standalone (NSA) or Handover scenario where the L3 DRX configuration is sent to the wireless device 22 prior to the random-access procedure in the SCG or target cell, the wireless device 22 may activate the DRX configuration after the wireless device 22 has successfully received the contention resolution grant. At that time point, both the wireless device 22 and network node 16 (or target network node 16 in the case of handover) may start its inactivity timer. From the network node 16 side, the network node 16 may know when the wireless device 22 has successfully received the contention resolution grant based on the wireless device 22 HARQ ACK/NACK feedbacks. There may be in a slight timing difference between wireless device 22 and network node 16 starting their inactivity timer due to the HARQ ACK/NACK feedback delay, but this slight timing difference may be compensated at the network node 16 since this slight timing difference value (also known as k2 in one or more wireless communication protocols such as 3GPP based protocols) is pre-determined.

Figure 12:
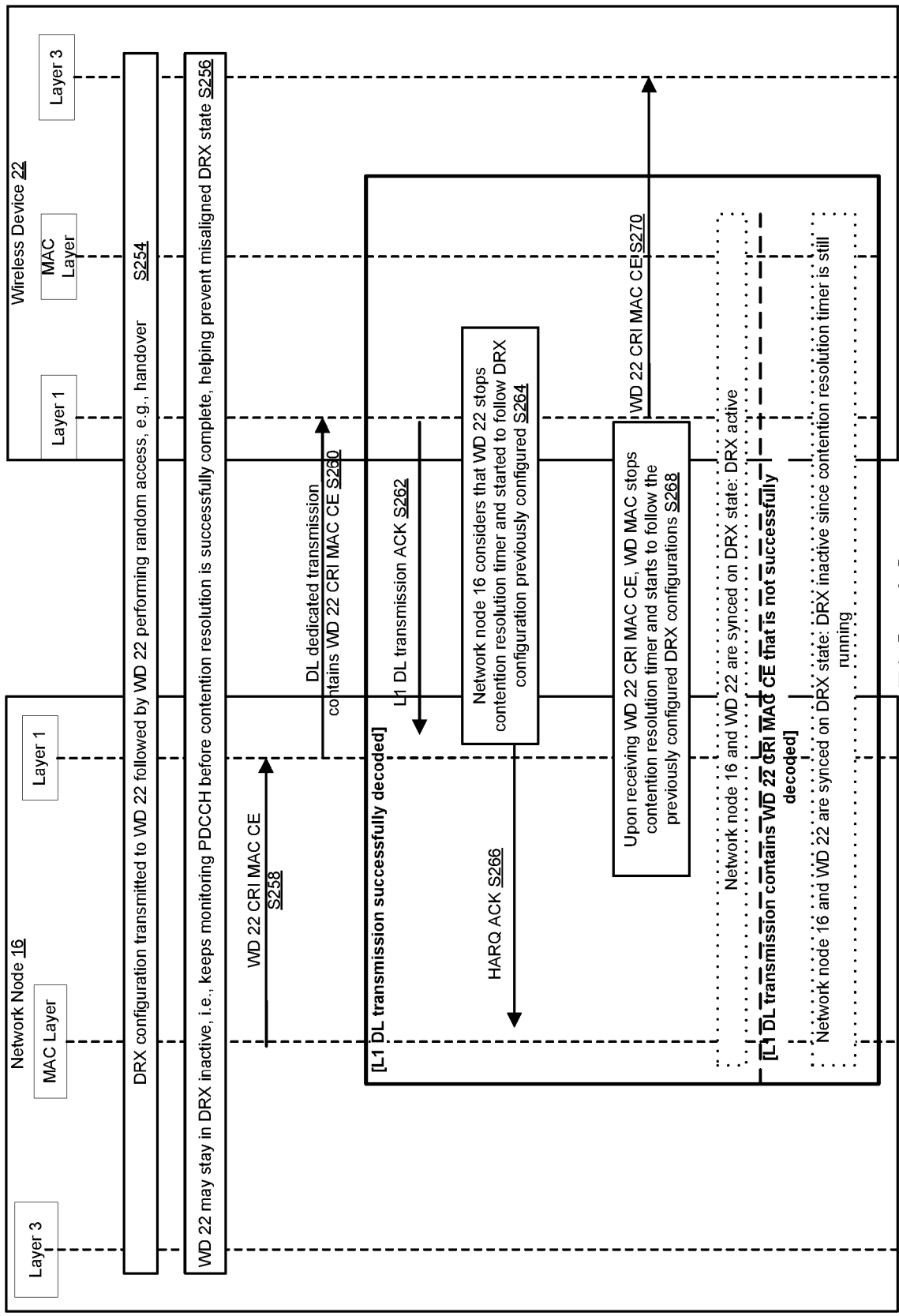
FIG. 12 is another signaling diagram for DRX activation/deactivation control according to some embodiments of the present disclosure.

FIG. 12 is another signaling diagram for DRX activation/deactivation control in accordance with some embodiments of the disclosure such as in accordance with method 4. The DRX configuration that is transmitted to the wireless device 22 is followed by wireless device 22 that is performing random access, e.g., handover (Block S254). The wireless device 22 may stay in DRX inactive, i.e., keeps monitoring PDCCH before contention resolution is successfully complete, thereby helping prevent misaligned DRX state (Block S256). The network node 16 communicates (Block S258), via processing circuitry 68 and/or signaling unit 32, a wireless device 22 CRI MAC CE (e.g., indication) from the MAC layer to layer 1 at the network node 16. The network node 16 transmits (Block S260), via radio interface 62 and/or signaling unit 32, a DL dedicated transmission containing/including WD 22 CRI MAC CE. In one or more embodiments, the WD 22 CRI MAC CE corresponds to an indication to trigger activation at communication layer 1 of a previous DRX/DRX configuration.

If the L1 DL transmission from the network node 16 to the wireless device 22 is successfully decoded, the wireless device 22 transmits (Block S262), via radio interface 82 and/or DRX unit 34, a L1 DL transmission ACK. Network node 16 considers/determines (Block S264), via processing circuitry 68 and/or signaling unit 32, that the wireless device 22 a contention resolution timer and started to follow DRX configuration previously configured. The network node 16 communicates (Block S266), via processing circuitry 68 and/or signaling unit 32, the HARQ ACK.

The wireless device 22, upon receiving wireless device 22 CRI MAC CE, the wireless device 22 MAC stops contention resolution timer and starts to follow the previously configured DRX configurations (Block S268). The wireless device 22 communicates (Block S270), via processing circuitry 84 and/or DRX unit 34, the wireless device 22 CRI MAC CE from layer 1 to layer 3 at the wireless device 22. Network node 16 and wireless device 22 are synced on DRX state: DRX active.

If L1 DL transmission contains/includes wireless device 22 CRI MAC CE that is not successfully decoded, network node 16 and wireless device 22 are synced on DRX state: DRX inactive since the contention resolution timer is still running.

Therefore, the one or more methods described herein advantageously provide accurate alignment of DRX states/statuses between the network node 16 and wireless device 22.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node, comprising processing circuitry configured to:
cause transmission of a Discontinuous Reception, DRX, configuration to a wireless device using communication layer 3 signaling;
cause transmission of an indication to the wireless device to trigger activation at one of communication layer 1 and communication layer 2 of the DRX configuration; and
determine whether the wireless device has activated the DRX configuration based on whether a hybrid automatic repeat request acknowledgement, HARQ ACK, is received in response to transmission of the indication.

2. The network node of claim 1, wherein the processing circuitry is further configured to determine whether the wireless device is performing a predetermined procedure, the DRX configuration being provided to the wireless device using communication layer 3 signaling before the predetermined procedure.

3. The network node of claim 2, wherein the predetermined procedure is a contention resolution procedure for random access.

4. The network node of claim 1, wherein the indication triggers activation at communication layer 2 using a Contention Resolution Identity Medium Access Control Control Element, CRI MAC CE, that triggers an action associated with the DRX configuration.

5. The network node of claim 1, wherein the indication triggers activation at communication layer 2 using a Medium Access Control, MAC, Control Element, CE, that indicates that the DRX configuration is to be activated.

6. The network node of claim 1, wherein the processing circuitry is further configured to cause transmission of another indication to the wireless device to trigger deactivation of the DRX configuration at communication layer 2 using a first Medium Access Control, MAC, Control Element, CE that indicates the DRX configuration is to be deactivated.

7. The network node of claim 6, wherein the indication triggers activation at communication layer 2 using a second MAC CE that indicates that the DRX configuration is to be activated.

8. The network node of claim 1, wherein the indication triggers activation at communication layer 1 using Downlink Control Information, DCI, that indicates that the DRX configuration is to be activated.

9. The network node of claim 8, wherein the DCI includes a bit dedicated to indicate whether to activate a DRX configuration.

10. A wireless device, comprising processing circuitry configured to:
receive a Discontinuous Reception, DRX, configuration using communication layer 3 signaling;
receive an indication to trigger activation at one of communication layer 1 and communication layer 2 of the DRX configuration;
activate the DRX configuration based at least in part on the indication; and
transmit a hybrid automatic repeat request acknowledgement, HARQ ACK, based on activation of the DRX configuration.

11. The wireless device of claim 10, wherein the processing circuitry is further configured to perform a predetermined procedure after configuration of the DRX configuration.

12. The wireless device of claim 11, wherein the predetermined procedure is a contention resolution procedure for random access.

13. The wireless device of claim 10, wherein the indication triggers activation at communication layer 2 using a Contention Resolution Identity Medium Access Control Control Element, CRI MAC CE, that triggers an action associated with the DRX configuration.

14. The wireless device of claim 10, wherein the indication triggers activation at communication layer 2 using a Medium Access Control, MAC, Control Element, CE, that indicates that the DRX configuration is to be activated.

15. The wireless device of claim 10, wherein the processing circuitry is further configured to receive another indication that triggers deactivation of the DRX configuration at communication layer 2 using a first Medium Access Control, MAC, Control Element, CE that indicates the DRX configuration is to be deactivated.

16. The wireless device of claim 15, wherein the indication triggers activation at communication layer 2 using a second MAC CE that indicates that the DRX configuration is to be activated.

17. The wireless device of claim 10, wherein the indication triggers activation at communication layer 1 using Downlink Control Information, DCI, that indicates that the DRX configuration is to be activated.

18. The wireless device of claim 17, wherein the DCI includes a bit dedicated to indicate whether to activate a DRX configuration.

19. A method implemented in a network node, the method comprising:
causing transmission of a Discontinuous Reception, DRX, configuration to a wireless device using communication layer 3 signaling;
causing transmission of an indication to the wireless device to trigger activation at one of communication layer 1 and communication layer 2 of the DRX configuration; and
determining whether the wireless device has activated the DRX configuration based on whether a hybrid automatic repeat request acknowledgement, HARQ ACK, is received in response to transmission of the indication.

20. The method of claim 19, further comprising determining whether the wireless device is performing a predetermined procedure, the DRX configuration being provided to the wireless device using communication layer 3 signaling before the predetermined procedure.

21. The method of claim 20, wherein the predetermined procedure is a contention resolution procedure for random access.

22. The method of claim 19, wherein the indication triggers activation at communication layer 2 using a Contention Resolution Identity Medium Access Control Control Element, CRI MAC CE, that triggers an action associated with the DRX configuration.

23. The method of claim 19, wherein the indication triggers activation at communication layer 2 using a Medium Access Control, MAC, Control Element, CE, that indicates that the DRX configuration is to be activated.

24. The method of claim 19, further comprising causing transmission of another indication to the wireless device to trigger deactivation of the DRX configuration at communication layer 2 using a first Medium Access Control, MAC, Control Element, CE that indicates the DRX configuration is to be deactivated.

25. The method of claim 24, wherein the indication triggers activation at communication layer 2 using a second MAC CE that indicates that the DRX configuration is to be activated.

26. The method of claim 19, wherein the indication triggers activation at communication layer 1 using Downlink Control Information, DCI, that indicates that the DRX configuration is to be activated.

27. The method of claim 26, wherein the DCI includes a bit dedicated to indicate whether to activate a DRX configuration.

28. A method implemented in a wireless device, the method comprising:
   receive a Discontinuous Reception, DRX, configuration using communication layer 3 signaling;
   receive an indication to trigger activation at one of communication layer 1 and communication layer 2 of the DRX configuration;
   activate the DRX configuration based at least in part on the indication; and
   transmit a hybrid automatic repeat request acknowledgement, HARQ ACK, based on activation of the DRX configuration.

29. The method of claim 28, further comprising performing a predetermined procedure after configuration of the DRX configuration.

30. The method of claim 29, wherein the predetermined procedure is a contention resolution procedure for random access.

31. The method of claim 28, wherein the indication triggers activation at communication layer 2 using a Contention Resolution Identity Medium Access Control Control Element, CRI MAC CE, that triggers an action associated with the DRX configuration.

32. The method of claim 28, wherein the indication triggers activation at communication layer 2 using a Medium Access Control, MAC, Control Element, CE, that indicates that the DRX configuration is to be activated.

33. The method of claim 28, further comprising receiving another indication that triggers deactivation of the DRX configuration at communication layer 2 using a first Medium Access Control, MAC, Control Element, CE that indicates the DRX configuration is to be deactivated.

34. The method of claim 33, wherein the indication triggers activation at communication layer 2 using a second MAC CE that indicates that the DRX configuration is to be activated.

35. The method of claim 28, wherein the indication triggers activation at communication layer 1 using Downlink Control Information, DCI, that indicates that the DRX configuration is to be activated.

36. The method of claim 35, wherein the DCI includes a bit dedicated to indicate whether to activate a DRX configuration.

* * * * *